United States Patent
Graham et al.

[15] 3,657,693
[45] Apr. 18, 1972

[54] MULTIPLE BEAM SCANNED PLANAR ARRAY

[72] Inventors: Walton Graham, Roslyn; Sheldon Gardner, Dix Hills, Huntington; John Cabot, Jackson Heights, all of N.Y.

[73] Assignee: Control Data Corporation, Minneapolis, Minn.

[22] Filed: Nov. 15, 1965

[21] Appl. No.: 507,961

[52] U.S. Cl. ........................... 340/6 R, 340/16 R, 343/113 R
[51] Int. Cl. ........................................................... G01s 3/00
[58] Field of Search ............... 343/100.6, 113, 113.2; 340/6, 340/16

[56] References Cited

UNITED STATES PATENTS 3,113,286  12/1963  Miller et al. .............................. 340/6
3,202,991  8/1965  Howells ................................. 343/100
3,292,177  12/1966  Brightman et al. ..................... 343/113

Primary Examiner—Richard A. Farley
Attorney—Darby & Darby

[57] ABSTRACT

Apparatus for determining the direction of arrival of an incoming wave front comprises a planar array of transducer elements arranged in N rows and N columns. The transducers are scanned serially in each row, and row by row, by a sequential sampler the output voltage of which comprises the sampled transducer voltages. A frequency spectrum analyzer such as a swept analyzer or bank of filters determines the frequency components of the sampler output which are related in a particular way to the angle of arrival of the incoming wave front.

6 Claims, 8 Drawing Figures

Patented April 18, 1972
3,657,693
4 Sheets-Sheet 1
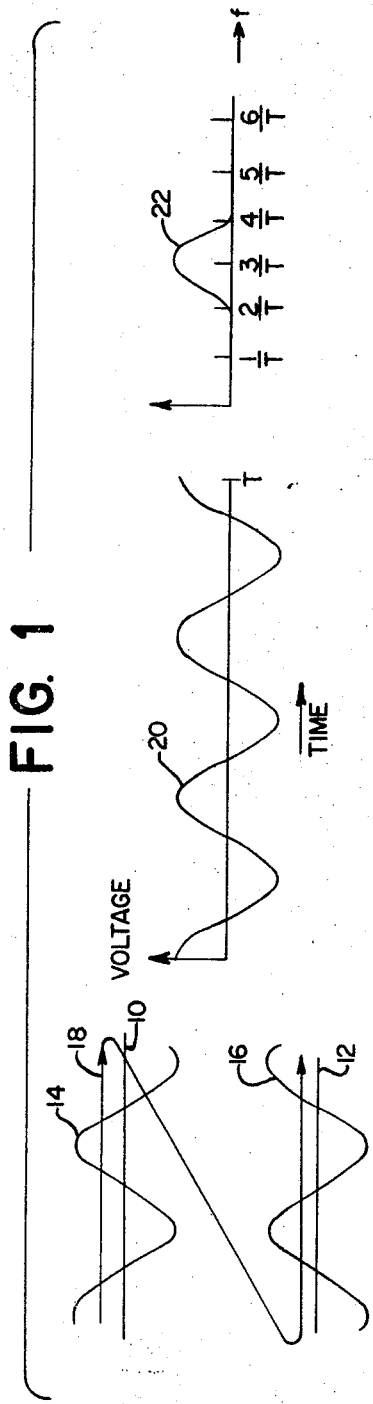
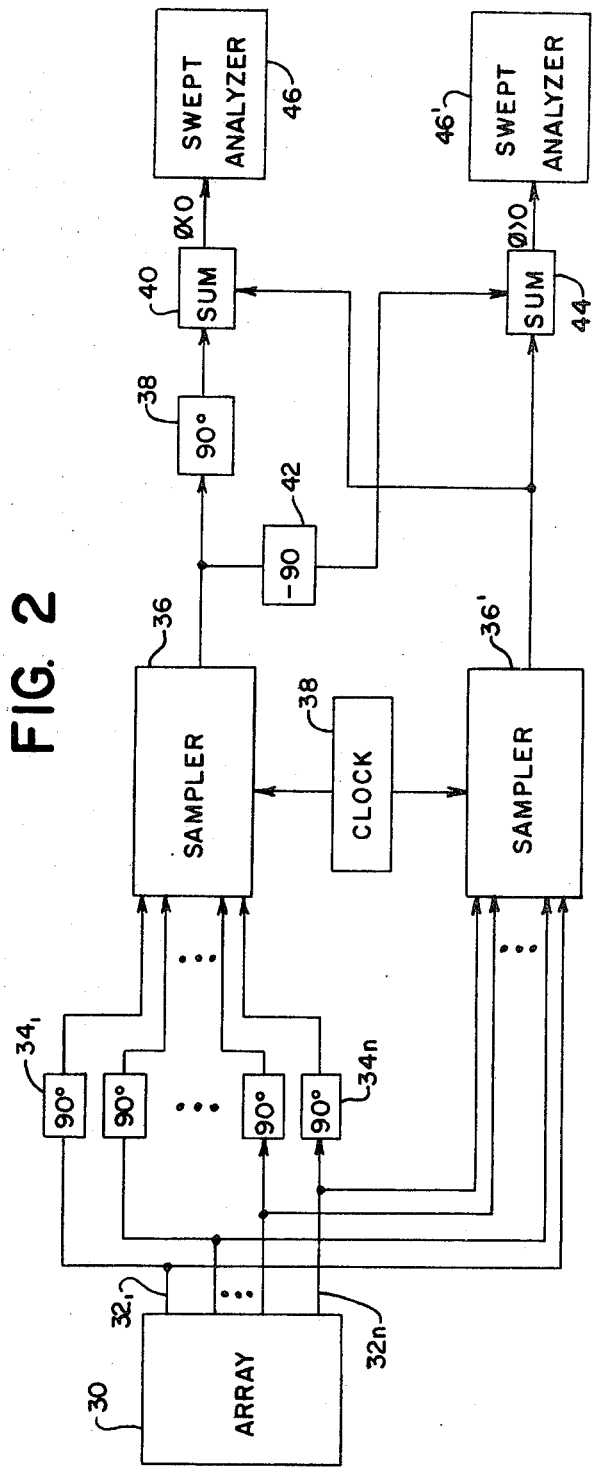
INVENTORS
WALTON GRAHAM
SHELDON GARDNER
JOHN CABOT
BY
*Darby & Darby*
ATTORNEYS

INVENTORS
WALTON GRAHAM
SHELDON GARDNER
JOHN CABOT

BY Darby & Darby
ATTORNEYS

INVENTORS
WALTON GRAHAM
SHELDON GARDNER
JOHN CABOT

BY
*Darby & Darby*
ATTORNEYS

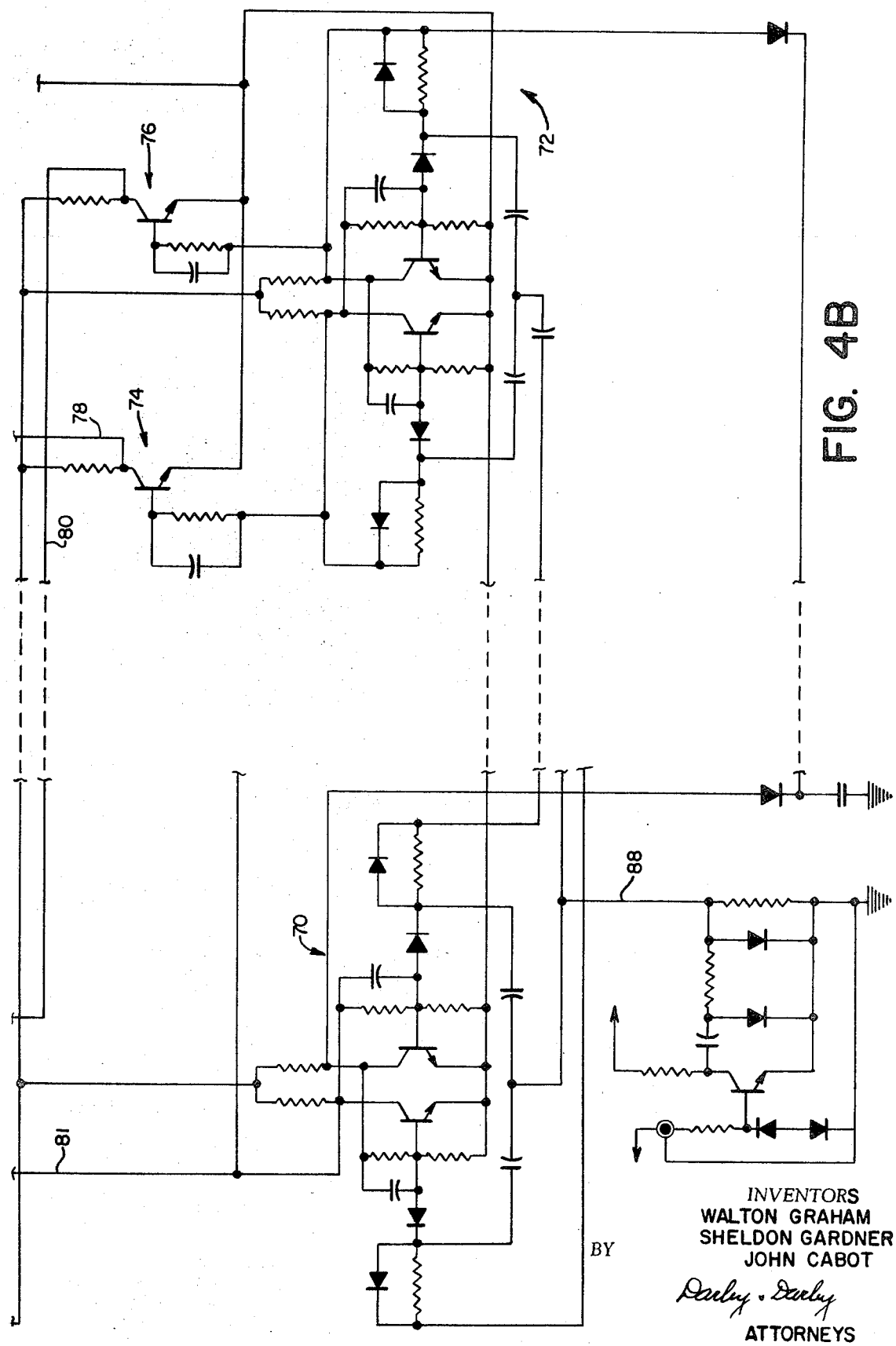

MULTIPLE BEAM SCANNED PLANAR ARRAY

The present invention relates to a planar array of radiating elements capable of providing a plurality of distinct radiation beams.

The following description and the drawings relate to a sonar shipboard installation, but the principles of the invention would be equally applicable to equivalent multiple beam forming systems, e.g., radar.

There are many reasons, particularly in the military, why it is desirable to transmit and/or receive sonar energy with a fixed radiation pattern having a large number of simultaneously pre-formed beams. In particular, the presence of such beams is beneficial in obtaining directional information with respect to targets or navigational fixes, and the desired beams may number in the thousands.

The first prior art systems for obtaining multiple beams required the use of discreet delay elements (such as counters or delay lines, etc.) between individual elements of an array, which, in the case of a large array producing thousands of beams, required a prohibitively high number of individual connections. To overcome this difficulty, it was proposed to eliminate the delay elements (thus reducing the number of connections) by sequentially sampling the individual array elements in a manner similar to a television raster scan. For an incoming signal, the location of the major components in the frequency spectrum of the sampled output is uniquely related to the signal's direction of arrival. However, such prior art configurations cause an ambiguity in that signals arriving at the same angle from either side of an axis transverse to the array will produce the same frequency spectrum. In effect, the system is unable to distinguish between positive and negative azimuthal angles.

Accordingly, the main object of this invention is to provide a multi-beam scanned array in which the above drawback is avoided.

A further object of the invention is to provide a multi-beam array which has no deleterious effect on the signal to noise ratio and requires no delay lines.

Briefly, the present invention is based on the discovery that when a plurality of radiating elements are suitably arranged in a planar formation and scanned appropriately, the frequency spectrum of the output of the scanner is uniquely dependent upon the angle of arrival without ambiguity. Additionally, the invention provides means to compensate for slight shifts in the output frequency spectra which are dependent upon the direction in which the various elements of the array are scanned.

The manner in which the above and other principles of the invention are accomplished is more fully described below with reference to the attached drawings, wherein:

FIG. 1 is an explanatory diagram illustrating the principles of the invention;

FIG. 2 shows theoretical wave forms which are used for explanatory purposes;

Figure 4A:
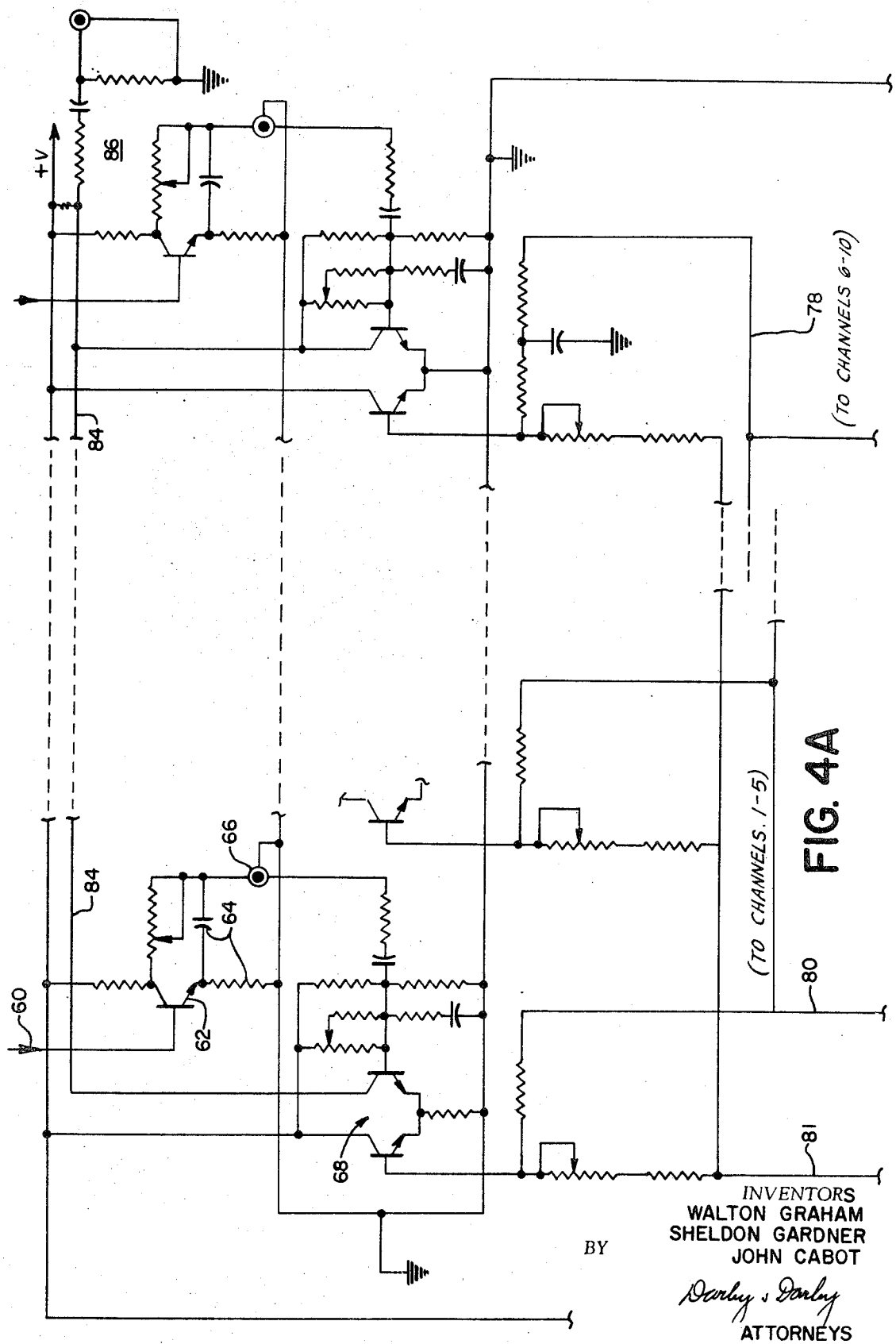

FIG. 4A and 4B comprise a circuit diagram of the output phase shifters and summing circuits of the preferred embodiment of the invention.

Figure 6:
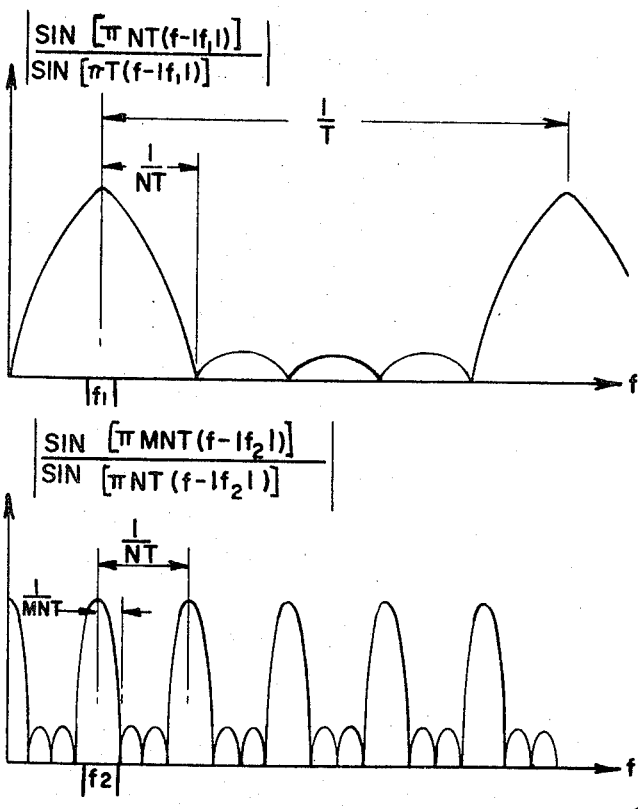
Figure 5A:
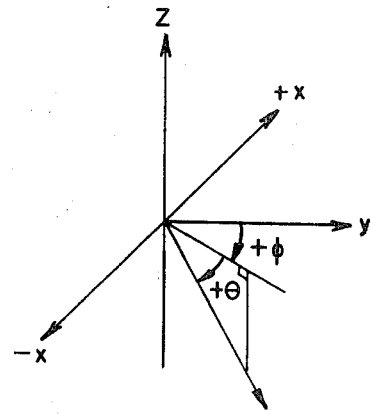
Figure 5B:
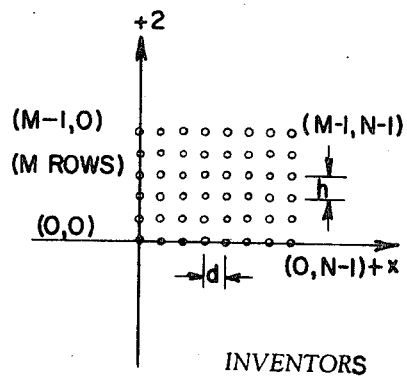

FIGS. 5A and 5B are explanatory diagrams used in conjunction with the theoretical analysis of the invention; and FIG. 6 is a graph drawn in accordance with the theoretical results showing the components of the output frequency spectrum.

In the following description the theoretical and practical aspects of the invention are explained with reference to a sonar receiver, with the received wave having an arbitrarily fixed sonic frequency. This particular example is selected primarily because it embodies an operative construction and is relatively easy to understand. However, the principles of the invention are not limited to any type of radiation as noted above, and moreover, those skilled in the art will recognize the applicability of various features of the invention to a wave transmitting system as opposed to a receiver.

In the following specification and claims the term "radiating element" includes receiving and transmitting elements such as acoustical transducers, waveguide slots, antennas, etc.

In FIG. 1 two linear arrays of conventional radiating elements such as acoustical transducers are illustrated schematically at 10 and 12. The linear arrays 10 and 12 are vertically displaced with respect to each other so that together they form a planar array. It is arbitrarily assumed that an incoming wave of known frequency has an angle of incidence with respect to the linear arrays 10 and 12 such that respective pressure distributions are caused as shown by the sine waves 14 and 16.

In accordance with the invention, and as explained more fully below, the arrays 10 and 12 are scanned along the path 18 in which case the voltage output of the scanner (shown at 20) will represent three complete cycles of a sine wave for one complete scanning operation. The time required for this scanning operation may be considered equal to T seconds. Because there are three full cycles in the time T, the output of the scanner will have a peak in its frequency spectrum at a frequency equal to 3/T as shown at the right of FIG. 1 by curve 22.

It can be similarly shown that depending upon the pressure distribution on the linear arrays 10 and 12, the number of scanner output cycles in time T will vary thus producing peaks at different points in the scanner output spectrum. Since, as is known, the pressure distribution curves 14 and 16 (for a fixed spacing between arrays 10 and 12) depend upon the angle of arrival of the incident wave, the peak 22 in the spectrum will occur at different frequencies depending upon such angle of incidence. It has been found that each incoming angle (measured in depression and azimuth) will produce a unique peak in the scanner output spectrum.

If the pressure distribution on the respective arrays is such that the output of the scanner contains a phase discontinuity, more than one peak will appear in the scanner spectrum. The addition of a further linear array permits compensation for this phase discontinuity by a change in the phase between the arrays. It can be shown that for each linear array added to a planar array a new resolvable frequency can be generated between each pair of frequencies corresponding to resolvable azimuthal angles. These new frequencies correspond to the additional resolvable depression angles associated with the increased array height.

It has been found that side bands exist in close proximity to the theoretical spectrum peak. A positive side band, i.e., a frequency greater than the peak, occurs when the incident wave moves along the array in the same direction as the elements are scanned, thus tending to reduce the equivalent doppler shift. The lower side band occurs when the incident wave moves against the direction of scan.

When using fixed filters it is relatively simple to separate the upper and lower sidebands to resolve the azimuthal ambiguity. However, for reasons of cost or other technical considerations, it may be desirable to use a conventional spectrum analyzer (a swept analyzer) to determine the output frequency of the sequential sampler. When using a swept analyzer it is probable that its bandwidth will encompass both the upper and lower sidebands so that the analyzer output will not indicate or resolve the ambiguity.

FIG. 2 illustrates a circuit using a swept analyzer which embodies the principles of the invention and incorporates a unique phase shifting technique to resolve such ambiguity by enhancing one sideband and rejecting the other.

In FIG. 2 the planar array is shown at 30. Array 30 includes a plurality of discreet transducer elements (not shown), each of which includes respective output lines $32_{10}$ to $32_n$. Each of the output lines is coupled through a 90° phase delay network $34_1$ to $34_n$ to a first sampler 36. The array output lines $32_1$ to $32_n$ are coupled directly to a second sampler 36'.

Both samplers 36 and 36' are driven by a common clock 38 so that they sample the array 30 at the same rate. The output of sampler 36 is delayed 90° in phase by a network 38 and combined in a summing circuit 40 with the output of sampler 36'.

The output of sampler 36 is also advanced 90° by a network 38 and combined in a summing circuit 44 with the output of sampler 36'. Summing circuit 40 will produce an output if the azimuthal angle ($\phi$) is less than zero (i.e., broadside) and summing circuit 44 will produce an output if the angle $\phi$ is greater than zero.

The output of summing circuit 40 is coupled to a swept analyzer 46 which displays the frequency spectrum at the output of summing circuit 40, and the output of summing circuit 44 is similarly coupled to swept analyzer 46'. If necessary, more than one swept analyzer may be used in each channel.

Since, as explained above, the frequency output of the samplers will be dependent upon the angle of arrival of the incident wave at array 30, and since the ambiguity in phase is compensated for as explained below by the phase shifting networks, the angle of arrival of the incident wave can be determined by examining the frequency spectra displayed by analyzers 46 and 46'.

The frequencies corresponding to a particular set of beam angles ($\theta m, \phi n$) are given in equation (2.4) below as $f_1 = f_o - (n/MNT)$, where $n$ is an integer with the same sign as $\sin \phi n$ and $\phi n$ is the azimuth angle relative to broadside. Two spectral components can occur about the frequency $n/MNT$ depending on the sign of $\phi n$. Positive n corresponds to a lower sideband relative to $n/MNT$. This occurs when the incident wave moves along the array in the same direction as the elements are scanned thus tending to reduce the equivalent doppler shift. Negative n corresponds to an upper sideband relative to $n/MNT$. This occurs when the incident wave moves against the direction of scan. The two components related to a particular azimuth angle are separated by $2 f_o$ and cannot be resolved by a swept analyzer.

A phase shifting technique for enhancing one sideband and rejecting the other is utilized by the invention as shown in FIG. 2. The two sequential samplers 36 and 36' operate on the individual sonar channels, but sampler 36 has a 90° phase shift introduced before and after sampling. The sum of the sampler outputs enhances the upper sideband and attenuates the lower sideband. A −90° shift at the sampler output would result in enhancement of the lower sideband. It is therefore possible to arrange swept analyzers 46 and 46' to display spectra corresponding to positive or negative azimuth angles alone and thus eliminate the possible ambiguity due to the closely spaced sideband components.

Figure 3:
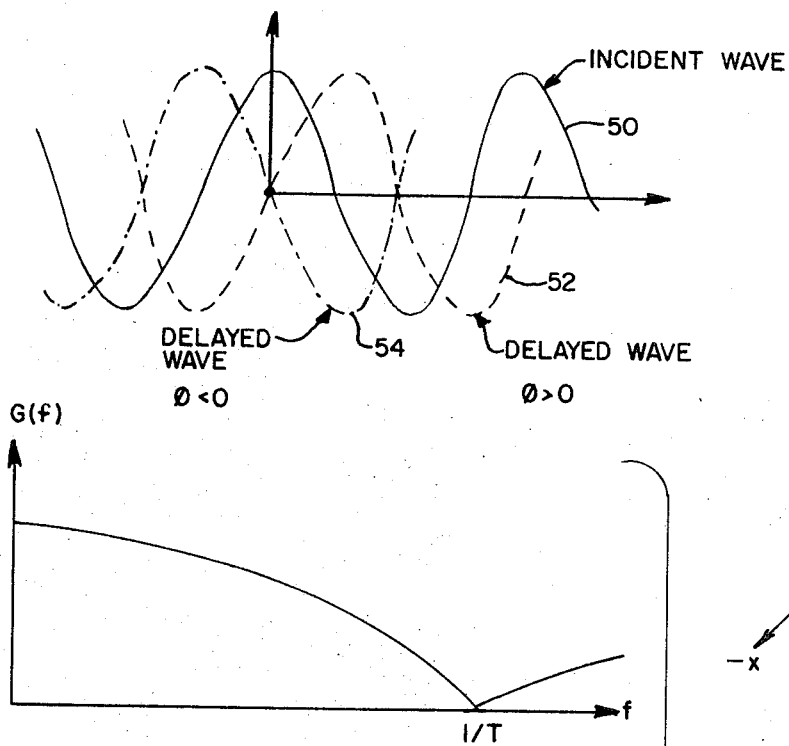
FIG. 3 is a circuit diagram of the phase shifting and sampler networks of the invention.

FIG. 3 illustrates the phase shifting principles discussed above. The incident wave is represented by the sine wave 50 as it appears on the planar array in the same fashion explained with reference to FIG. 1. If this incident wave 50 is then shifted 90° at all points along the array, the output of the sampler 36 will have the wave form shown by the dashed lines 52 or 54 depending upon the direction in which scanning occurs. If the sampler output is now advanced in phase by 90° and added to the unshifted sampled signal, either re-enforcement or cancellation will take place depending upon the direction of arrival.

The manner in which the invention may be used with fixed filters in place of the swept analyzers should be apparent to those skilled in the art, and is not illustrated here in detail. Since it is not necessary to reject one of the sidebands, all of the phase-shifting circuitry illustrated in FIG. 2 may be dispensed with, and a single sequential sampler will suffice. Thus, the output of sampler 36' may be coupled in parallel to a bank of fixed filters each of which passes a frequency which will correspond, as explained above, to a particular beam angle. Thus, it is only necessary to determine which of the filters has passed an output signal to determine the angle of arrival of the incoming signal. In the event the angle of arrival does not correspond exactly to a predetermined frequency or beam direction, the adjacent filters will have proportional outputs which may be interpolated to provide a close approximation to the actual angle of arrival of the wave.

FIGS. 4A and 4B comprise a schematic diagram of a sequential sampler together with the input phase shifters which may be used in accordance with the invention. For purposes of simplicity, the sampler circuit is shown in conjunction with a 10 channel system, although it will be clear to those skilled in the art that the invention is not limited to any particular number of channels. Each of the channels is responsive to a single transducer in the planar array as described above, and which, in the case of FIGS. 4A and 4B, would be a 10 transducer array. By way of further example, the array may consist of two rows of five transducers each so that the channels one to five correspond to the first row and channels six to 10 to the second row.

Since the circuits in each channel are substantially the same, only those circuits in channels No. one and 10 are illustrated and described, it being understood that the remaining circuits operate in the same fashion.

The signal on line 60 represents the output of the first transducer in the first row and is coupled to the base of an emitter follower 62, the output of which is coupled through an RC phase lag network 64 to provide the 900° phase shift of circuit $34_1$ (shown in FIG. 2). The output of the phase lag network 64 is connected via a coaxial cable 66 to the input of a gate which comprises a common emitter amplifier 68.

A five stage ring counter which is conventional, sequentially opens the respective channel gates to pass the input signal appearing on the associated transducer. Each of the ring counter stages may comprise a flip-flop such as the one shown at 70 in FIG. 4B. A sixth flip-flop 72 applies control signals via respective inverters 74 and 76 to enabling lines 78 and 80 respectively. Thus, when flip-flop 70 causes a voltage to appear on line 81 at the same time that flip-flop 72 enables gate 68 via line 80, the gate 68 passes an amplified voltage onto line 84 representative of the signal amplitude appearing on transducer line 60. As shown, all of the output gate collectors are common to line 84 so that the output may be taken across the load 86.

Flip-flop 72 changes state after every five clock pulses which drive the ring counter and which are applied to line 88 by a conventional clock pulse generator. Thus, in a manner which will be obvious to those skilled in the art, the gates in channels one to 10 are sequentially opened to pass the respective transducer signals to the output line 84.

The transition from one sample gate to another is arranged to minimize dead time and switching transients. The sampling length may be about 90 percent of the sampling time T (e.g., 2 $\mu$sec). As a result the gate collector voltages are constant in the absence of signals and the signal spectra are at least 25 db. stronger than switching components, a desirable feature where threshold detection of signals is contemplated.

The above description sets forth the principles of the invention in sufficient detail so that one skilled in the art could make and use the invention. The following is a mathematical analysis showing the relationship of the transducer configuration, the frequency and angle of arrival of the incoming signal to the output frequency.

1. Signal Analysis

Let a multi-element planar array be located in the spherical coordinate system shown in FIG. 5A. The array has M rows, and N columns of individual transducers as shown in FIG. 5B. The horizontal interelement separation is $d$; the vertical separation is $h$.

Scanning is assumed to be sequential along the columns, row by row. Thus the scanning operation proceeds from (0,0) along row one to (0,N-1), then to (1,0) and along the second row to (1,N-1).

Let the incident signal be a plane wave coming from a direction ($\theta,\phi$). In element ($p,v$), the signal is $s(t - v\tau 1 - p\tau_2)$ where $\tau_1 = d/c \cos\theta \sin\phi$     (1-1)
$\tau_2 = h/c \sin\theta$     (1-2)

We desire an expression for $y(t)$, the scanned output of the array. This expression will then be Fourier transformed in order to obtain the output spectrum.

The output signal $y(t)$ may be written as $$y(t) = \sum_{p=0}^{M-1} \sum_{v=0}^{N-1} s(t - v\tau_1 - p\tau_2) g(t - vT - pNT) \quad (1-3)$$

where the sampling function $g(t)$ is defined as $$g(t) = \begin{cases} 1 \text{ when } |t| < \Delta/2 \\ 0 \text{ when } |t| > \Delta/2 \end{cases} \quad (1-4)$$

and $T \geq \Delta$.

The spectrum of the signal $y(t)$ is $$Y(\omega) = \int_{-\infty}^{+\infty} y(t) e^{-i\omega t} dt \quad (1-5)$$

Using Eq. (1-3) for $y(t)$ and the convolution properties of the transform for products of time functions, the spectrum of the scanned signal is $$Y(\omega) = \frac{1}{2\pi} \sum_{p=0}^{M-1} \sum_{v=0}^{N-1} \int_{-\infty}^{\infty} dx\, G(x) S(\omega - x) \exp[-ixT(v + pN)]$$
$$\cdot \exp[-i(\omega - x)(v\tau_1 + p\tau_2)] \quad (1-6)$$

where $$G(\omega) = \frac{\Delta \sin(\omega \Delta/2)}{(\omega \Delta/2)} \quad (1-7)$$

and for a sinusoidal signal $\cos(\omega_0 t)$ $$S(\omega) = \pi[\delta(\omega - \omega_0) + (\omega + \omega_0)] \quad (1-8)$$

Substituting Eq. (1-8) into Eq. (1-6) and performing the convolution $$Y(\omega) = \tfrac{1}{2} \sum_{p=0}^{M-1} \sum_{v=0}^{N-1} G(\omega - \omega_0) \exp[-i(\omega - \omega_0)vT - i\omega_0 v\tau_1]$$
$$\cdot \exp[-i(\omega - \omega_0)pNT - i\omega_0 p\tau_2]$$
$$+ \tfrac{1}{2} \sum_{p=0}^{M-1} \sum_{v=0}^{N-1} G(\omega + \omega_0) \exp[-i(\omega + \omega_0)vT + i\omega_0 v\tau_1]$$
$$\cdot \exp[-i(\omega + \omega_0)pNT + i\omega_0 p\tau_2] \quad (1-9)$$

Evaluating the double sums in Eq. (1-9)

$$Y(\omega) = \frac{G(\omega - \omega_0)}{2} \left\{ \frac{1 - \exp[-iNT(\omega - \omega_0) - i\omega_0 N\tau_1]}{1 - \exp[-iT(\omega - \omega_0) - i\omega_0 \tau_1]} \right.$$
$$\left. \cdot \frac{1 - \exp[-iMNT(\omega - \omega_0) - i\omega_0 M\tau_2]}{1 - \exp[-iNT(\omega - \omega_0) - i\omega \tau_2]} \right\}$$
$$+ \frac{G(\omega + \omega_0)}{2} \left\{ \frac{1 - \exp[-iNT(\omega + \omega_0) + i\omega_0 N\tau_1]}{1 - \exp[-iT(\omega + \omega_0) + i\omega_0 \tau_1]} \right.$$
$$\left. \cdot \frac{1 - \exp[-iMNT(\omega + \omega_0) + i\omega_0 M\tau_2]}{1 - \exp[-iNT(\omega + \omega_0) + i\omega_0 \tau_2]} \right\} \quad (1-10)$$

It is useful to write the spectrum Eq. (1-10) in complex notation as the product of magnitudes and phase factors.

$$Y(f) = \frac{G(f - f_0)}{2} \frac{\sin[\pi NT(f - f_1)]}{\sin[\pi T(f - f_1)]} \frac{\sin[\pi MNT(f - f_2)]}{\sin[\pi NT(f - f_2)]}$$
$$\cdot \exp[-i\pi(N-1)(f - f_1)T - i\pi(M-1)(f - f_2)NT]$$
$$+ \frac{G(f + f_0)}{2} \frac{\sin[\pi NT(f + f_1)]}{\sin[\pi T(f + f_1)]} \frac{\sin[\pi MNT(f + f_2)]}{\sin[\pi NT(f + f_2)]}$$
$$\cdot \exp[-i\pi(N-1)(f + f_1)T - i\pi(M-1)(f + f_2)NT] \quad (1-11)$$

where $$\begin{cases} f_1 = f_0 \left(1 - \dfrac{\tau_1}{T}\right) & (1-12) \\ f_2 = f_0 \left(1 - \dfrac{\tau_2}{NT}\right) & (1-13) \end{cases}$$

Provided $d/\lambda \leq 1/2$, the magnitude of the spectrum for $0 \leq f \leq 1/2T$ is approximately $$|Y(f)| \sim \frac{G(f - f_0)}{2} \frac{\sin[\pi NT(f - |f_1|)]}{\sin[\pi T(f - |f_1|)]} \frac{\sin[\pi MNT(f - |f_2|)]}{\sin[\pi NT(f - |f_2|)]} \quad (1-14)$$

The magnitude of the spectrum Eq. (1-14) is determined by the product of three functions of frequency. The first function $G(f-f_0)$ is related to the finite duration of the sampling pulse $g(t)$. The second function is related to the number of columns $N$ and frequency shift due to azimuthal delay $\tau_1$. The third function is related to the number of rows and to the vertical delay $\tau_2$. These functions are shown in FIG. 6. For $\Delta = T$, the first zero of $G(f-f_0)$ occurs at $f = 1/T$. The second function peaks at $f = |f_1|$, has a major lobe width between zeroes of $2/NT$, and is periodic in frequency with period $1/T$. The third function peaks at $f = |f_2|$, has a major lobe width between zeroes of $2/MNT$, and is periodic in frequency with period $1/NT$.

2. Formation of Multiple Pre-formed Beams

The formation of multiple pre-formed beams and the angular resolution properties of the scanned planar array will be discussed. From FIG. 6 it is evident that the formation of a beam corresponds to a peak of both $M$ and $N$ functions occurring at a single frequency. These frequencies will occur at multiples of $1/MNT$, and will be called "beam frequencies." For beam formation, the following equation must be satisfied $$f_1 = f_2 + (k/NT) \quad (2.1)$$

where $k$ is an integer.

In order to resolve two beams they must be separated by at least $(1/MNT)$ in frequency. The permissible values of $f_2$ are $$f_2 = f_0 - (m/MNT) \quad (2.2)$$
$$m = 0, \pm 1 \ldots \pm (M-1)$$

Comparing Eq. (2.2) with Eq. (1.13), beams are found to occur at depression angles which satisfy $$\sin(\theta_m) = \lambda m/hM \quad (2.3)$$

Similarly, for $f_1$ we may write $$f_1 = f_0 - \frac{n}{MNT} \quad (2.4)$$

$$n = 0, \pm 1, \ldots \begin{cases} \pm \dfrac{NM}{2} & N \text{ even} \\ \pm \dfrac{(N-1)M}{2} & N \text{ odd} \end{cases}$$

Comparing Eq. (2.4) with Eq. (1.12), the following set of allowed azimuthal angles are found $$\sin(\phi_{n_m}) = \frac{\lambda n}{dNM} \cos \theta_m \quad (2.5)$$

It should be noted that because of the beam condition Eq. (2.1) a relation exists between permissible values of $m,n$. By substituting Eq. (2.2) for $f_2$, and Eq. (2.4) for $f_1$ into Eq. (2.1), we find that $$n = m - km \quad (2.6)$$

For given values of $h/\lambda$, $d/\lambda$, $M$, $N$ the location of all preformed beams may be determined by means of Eq. (2.3) for $\theta_m$, and Eq. (2.5) for $\phi_{nm}$.

3. Angular Resolution

The angular resolution of a scanned planar array beamforming system will be shown to be equivalent to conventional beamforming techniques. For convenience we rewrite Eqs. (1.12) and (1.13) for the output frequencies $f_1$ and $f_2$ $$f_1 = f_0 - \frac{f_0 d}{cT} \sin \phi \cos \theta \qquad (1.12)$$

$$f_2 = f_0 - \frac{f_0 h}{cNT} \sin \theta \qquad (1.13)$$

We wish to determine the change in angle $\Delta\phi$ which is required to shift the output frequency $f_1$ by $1/NT$. This value of $\Delta\phi$ is a measure of the azimuthal resolution of the system. From Eq. (1.12)

$$\Delta f_1 = -(d/\lambda T) \cos\phi \cos\theta \, \Delta\phi \qquad (3.1)$$

Setting $\Delta f_1$ equal to $1/NT$ and solving for $|\Delta\phi|$ $$|\Delta\phi| = \left| \frac{1}{\frac{Na}{\lambda} \cos\phi \cos\theta} \right| \qquad (3.2)$$

In a similar fashion from Eq. (1.13), the measure of angular resolution in depression angle may be shown to be $$|\Delta\theta| = \left| \frac{1}{\frac{Mh}{\lambda} \cos\theta} \right| \qquad (3.3)$$

Therefore, the resolution properties of the scanned planar array are identical to those of conventional techniques.

What is claimed is

1. Apparatus for detecting the arrival of a wave front from a given direction, comprising an array of transducer elements responsive to said wave, said array consisting of M rows of N transducer elements, a first sequential sampler coupled to each of said transducer elements for sampling the voltage on each of said elements in a preselected sequence, a second sequential sampler, phase shifting means connected between each of said transducer elements and said second sequential sampler, driving means for causing said first and second sequential samplers to sample the voltages on the same transducers at the same time, means for delaying the output of said second sampler a fixed amount with respect to the output of said first sampler, means for advancing the output of said second sampler a fixed amount in phase with respect to the output of said first sampler, first combining means for combining the relatively delayed output of said second sampler with the output of said first sampler, second combining means for combining the relatively advanced output of said second sampler with said first sampler, and frequency responsive means coupled to said first and second combining means for determining the frequency components of the outputs of said combining means to thereby determine the angles of elevation and azimuth of said wave front.

2. Apparatus according to claim 1, wherein said frequency responsive means comprises swept analyzers.

3. Multi-beam energy translating apparatus, comprising M rows of N transducer elements, sequential sampler means for sequentially coupling each of the transducers in a preselected sequence to an output line, and means for analyzing the frequency spectrum of the voltage appearing on said output line to provide an indication of both the angle of elevation and the angle of azimuth of a wave translated by said apparatus.

4. Multi-beam energy receiving apparatus, comprising M rows of N transducer elements, sampler means for sequentially coupling the transducers in a preselected order to an output line, the transducers in each row being coupled to said output line in succession and after all of the transducers in the next adjacent row have been coupled to the output line, and means for analyzing the frequency spectrum of the voltage appearing on said output line to provide an indication of both the angle of elevation and the angle of azimuth of an incoming wave received by said apparatus.

5. Apparatus according to claim 4, wherein said analyzing means comprises means for displaying said frequency spectrum.

6. Apparatus according to claim 5, wherein said analyzing means comprises a plurality of filters tuned to pass different frequencies, whereby said angles of elevation and azimuth are indicated by the magnitudes of the outputs of said filters.

* * * * *